United States Patent [19]

Kawasaki

[11] Patent Number: 5,359,419
[45] Date of Patent: Oct. 25, 1994

[54] PROGRAMMABLE CATV SYSTEM AND TERMAINAL UNIT THEREFOR, INCLUDING ACKNOWLEDGEMENT OF PROGRAM REQUEST

[75] Inventor: Masahiko Kawasaki, Tokyo, Japan

[73] Assignee: Pioneer Electronic Corporation, Tokyo, Japan

[21] Appl. No.: 845,365

[22] Filed: Mar. 5, 1992

Related U.S. Application Data

[63] Continuation of Ser. No. 432,942, Nov. 7, 1989, abandoned.

[30] Foreign Application Priority Data

Apr. 10, 1989 [JP] Japan ............................ 1-88073

[51] Int. Cl.$^5$ .......................................... H04N 7/10
[52] U.S. Cl. ..................................... 348/6; 455/4.2; 455/6.2
[58] Field of Search .................. 358/86; 455/3, 4, 5, 455/6, 3.1, 4.1, 4.2, 5.1, 6.1, 6.2

[56] References Cited

U.S. PATENT DOCUMENTS

| | | | |
|---|---|---|---|
| 4,348,691 | 9/1982 | Mistry | 358/86 |
| 4,381,522 | 4/1983 | Lambert | 358/86 |
| 4,450,481 | 5/1984 | Dickinson | 358/86 |
| 4,512,033 | 4/1985 | Schrock | 358/86 |
| 4,558,464 | 12/1985 | O'Brien, Jr. | 358/86 |
| 4,567,512 | 1/1986 | Abraham | 455/4 |
| 4,700,386 | 10/1987 | Kohn | 358/86 |

FOREIGN PATENT DOCUMENTS

WO850830 8/1985 PCT Int'l Appl. .
2176675 12/1986 United Kingdom .

Primary Examiner—Edward F. Urban
Attorney, Agent, or Firm—Sughrue, Mion, Zinn, Macpeak & Seas

[57] ABSTRACT

A CATV system is provided with a head end apparatus which transmits program data to each subscriber of a chargeable program so that a subscriber knows at the time of applying for a chargeable program whether or not his request is accepted.

8 Claims, 3 Drawing Sheets

FIG. 3

| CHANNEL | TIME | 13(MONDAY) | | 14(TUESDAY) | |
| --- | --- | --- | --- | --- | --- |
| | | TITLE OF PROGRAM | PROGRAM NUMBER | TITLE OF PROGRAM | PROGRAM NUMBER |
| 15 | 19:00 | NEWS | 151319 | CARTOON | 151419 |
| | 20:00 | DRAMA | 151320 | FOREIGN MOVIE | 151420 |
| | 22:00 | SPORT | 151322 | | |
| 16 | 19:00 | BASEBALL | 161319 | NEWS | 161419 |
| | 21:00 | DOMESTIC MOVIE | 161321 | MUSIC | 161421 |
| | 23:00 | NEWS | 161323 | CNN | 161423 |

PROGRAMMABLE CATV SYSTEM AND TERMAINAL UNIT THEREFOR, INCLUDING ACKNOWLEDGEMENT OF PROGRAM REQUEST

This is a continuation of application Ser. No. 07/432,942 filed Nov. 7, 1989, now abandoned.

FIELD OF THE INVENTION

This invention relates to a one-way addressable (OWA) type CATV system and a CATV terminal unit for usa therein, in which an individual address is assigned to each subscriber's terminal unit and the subscriber is permitted to or prohibited from watching a program based on a control signal transmitted from a control center.

BACKGROUND OF THE INVENTION

Generally, a control center (head end) apparatus in the CATV system of this type comprises a VHF antenna, an UHF antenna, and a BS antenna for receiving broadcast waves of existing broadcasting stations, and the broadcasting signals received by these antennas are respectively processed and mixed before being transmitted via a transmission line, which may be for example, a coaxial cable.

The control center apparatus also comprises a video camera, a video tape recorder (VTR) or the like, used as a source for broadcasting independently produced programs, and is constructed so as to select one of these sources.

The control center apparatus determines from which source the signal should be obtained according to the program broadcasting schedule. The center apparatus modulates a TV signal from the selected source to have a specific channel frequency, and mixes the TV signal with other signals before transmitting them via the transmission line.

Further, the control center apparatus transmits data such as channel data and permission or prohibition data for receiving a specific program to a subscriber terminal unit in the form of an FSK signal on a channel prepared in advance.

Each CATV terminal unit has a unique address by which only the terminal unit belonging to a subscriber to chargeable programs is allowed to receive the chargeable programs. Thus, each terminal unit processes the FSK signals transmitted as out-band data from the control center apparatus, and only the terminal unit which has received the permission data is allowed to select a desired signal out of signals transmitted via the transmission line based on the result of the process. Further, only the terminal unit with permission descrambles the selected signal if the selected signal carries a chargeable program and has been scrambled by the control center apparatus, and modulates the descrambled signal to a signal having a specific channel frequency, e.g., channel 1 or channel 2, of a television receiver 4 before outputting the signal.

The CATV terminal unit further comprises an input unit provided on the main body thereof, or an input unit separately supplied as a remote control unit. Operation of this input unit executes channel selection.

The above-mentioned CATV system has an additional function of supporting the watching of programs on a so-called "pay per event" basis, in which "real-time" broadcasting such as a title match or a concert can be watched by applying for the program by telephone.

In the "pay per event" function, the operation at the control center apparatus registers data such as a subscriber's number and program information on a desired program by operating a key or keys of the input unit so that permission data is transmitted to the subscriber when the desired program is broadcast, thereby allowing the subscriber who has applied for the program to watch the program.

As described above, in the conventional CATV system, even though the subscriber applies for a program by telephone and the operator who receives the application at the center apparatus registers the application, the data for permitting the subscriber to watch the program applied for is not transmitted to the subscriber until the applied program is actually broadcast. Accordingly, the subscriber who has made the application by telephone is not notified whether he or she can watch the applied for program until the applied for program is actually broadcast. This causes anxiety in the subscriber.

In view of the above problem, the present invention provides a CATV system and a CATV terminal unit therefor, in which the subscriber may confirm at any time after the application has been made by telephone whether or not he or she has been permitted to watch the applied for program.

SUMMARY OF THE INVENTION

Accordingly, the present invention is directed to overcoming the noted problems in the prior art.

The CATV system according to the present invention solves the above problem by providing a one-way addressable type CATV system in which permission or prohibition data for watching a program is transmitted from a control center apparatus to each subscriber, and only a CATV terminal unit which has received the permission data is allowed to receive the chargeable program. Based on the registration of an application for watching a program, the control center apparatus transmits program data to a subscriber who applied for the program, and the CATV terminal unit comprises memory means for receiving and storing the program data transmitted from the control center apparatus and display means for reading and displaying the data stored in the memory means.

The CATV terminal unit according to the present invention includes a terminal unit receiving program data transmitted via a transmission line from a control center apparatus. Further, the device comprises memory means for storing the program data, input means for inputting an instruction for reading the program data stored in the memory means, reading means for reading the program data stored in the memory means according to the instruction for reading from the input means, and display means for making a display by which the program can be identified based on the program data read from the storing means by the reading means.

In the CATV system arranged as described above, the control center apparatus transmits permission or prohibition data to each subscriber based on the registration of an application for a program. Program data is transmitted to the subscriber having applied for the program, and the CATV terminal unit receives and stores the transmitted data, and reads and displays the stored data. Thus, by causing the stored program data to be displayed, the subscriber is notified easily whether he or she is permitted to watch the program, whereby the subscriber is liberated from his or her anxiety.

In the CATV terminal unit arranged as described above, the program data received by the terminal unit from the control center apparatus is stored, and the stored data is read and displayed so that the program can be identified based on the data. As a result, the subscriber is easily notified whether he or she has been permitted to watch the applied for program by referring to the display, whereby the subscriber is liberated from anxiety.

BRIEF DESCRIPTION OF THE DRAWINGS

FIG. 3 is a diagram showing an example of a program list used in association with the invention.

DETAILED DESCRIPTION OF THE PREFERRED EMBODIMENT

A description of preferred embodiments according to this invention follows with reference to the drawings.

Figure 1:
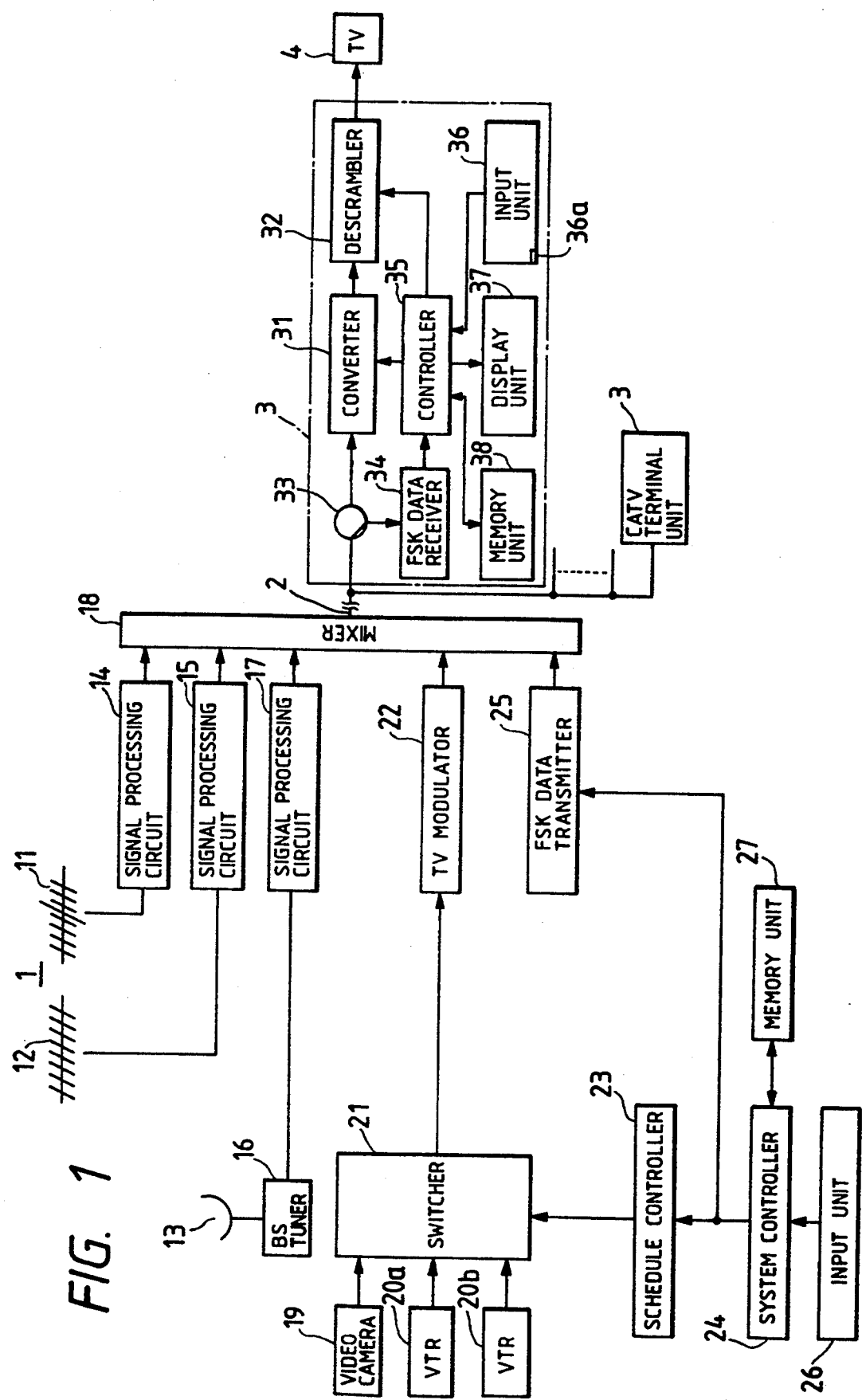
FIG. 1 is a block diagram showing an embodiment of the CATV according to the invention.

FIG. 1 is a block diagram showing an embodiment of the CATV system according to the present invention. The CATV system shown in the figure comprises a control center (head end) apparatus 1, a transmission line 2 which may be made of a coaxial cable, and a number of CATV terminal units 3 connected to the control center apparatus 1 via the transmission line 2.

The control center apparatus 1 comprises a VHF antenna 11, an UHF antenna 12, and a BS antenna 13, each of which receives a broadcasting signal from existing broadcasting stations. The broadcasting signals received by the VHF antenna 11 and UHF antenna 12 are supplied to respective signal processing circuits 14 and 15, while the broadcasting signal received by the BS antenna 13 is supplied to a signal processing circuit 17 via a BS tuner 16. The signal processing circuits 14, 15, and 17 respectively process the broadcasting signals received by the corresponding antennas 11 to 13, and these broadcasting signals processed by the signal processing circuits 14, 15, and 17 are mixed by a mixer 18, and then transmitted to the CATV terminal units 3 via the transmission line 2.

The control center apparatus 1 also comprises a video camera 19 and video tape recorders (VTR 20a and 20b) for use as a video source for broadcasting independently produced programs. These video sources are connected to a switcher 21. The switcher 21 selects a video source and transmits a TV signal from the selected video source to a TV modulator 22. The TV modulator 22 converts the TV signal from the video source selected by the switcher 21 to a signal having a specific channel frequency and supplies this frequency-converted video signal to the mixer 18.

The switcher 21 is controlled by a system controller 24 according to a program broadcasting schedule via a schedule controller 23. Namely, a specific video source is selected by the schedule controller 23 which switches the switcher 21 under the control of the system controller 24. More specifically, the schedule controller 23 transmits data to the switcher 21 according to the program broadcasting schedule from the system controller 24 and causes the switcher 21 to select a source out of such sources as the video camera 19 and the VTRs 20a, 20b from which the TV signal will be obtained. The TV signal from the video source selected by the switcher 21 is modulated to have a specific channel frequency by the TV modulator 22 and mixed with other signals by the mixer 18 before being transmitted via the transmission line 2.

An input unit 26 comprising, for example, a keyboard, and memory unit 27 comprising, for example, a RAM and a ROM, are respectively connected to the system controller 24. The input unit 26 is used by an operator to input program broadcasting schedule data or to register permission for watching a program with the key operation when the operator has received a telephone application for watching a chargeable program from a subscriber. The data to be inputted at this time includes information indicating the permission registration for watching a program, the subscriber's number, and the program number. The memory unit 27 comprises a RAM for storing data related to the program broadcasting schedule or permission registration for watching a program inputted from the input data 26, in addition to the ROM for storing a program for controlling a CPU in the system controller 24. The data stored in the RAM of the memory unit 27 is read by the system controller 24, and is used for automatically switching between broadcasting programs or transmitting permission or prohibition data in association with the broadcasting of chargeable programs.

Furthermore, the system controller 24 outputs data such as channel data and permission or prohibition data for receiving a specific program to the terminal unit of each subscriber. The channel data and permission or prohibition data is output almost simultaneously with the above-mentioned output of the data for selecting a video source to the schedule controller 23 according to the program broadcasting schedule. Also, when the operator completes the key operation for registering permission for watching a program, the system controller 24 transmits data consisting of an ID command indicating that the data is the authorizing command data, and a program number in the format shown in FIG. 2 to the subscriber who has applied for the registered program. The data is transmitted on a channel prepared in advance via an FSK data transmitter 25 and the mixer 18.

The CATV terminal unit 3 comprises a converter 31 and a descrambler 32. The converter 31 not only selects a desired signal from a number of broadcasting signals transmitted by frequency-multiplexing via the transmission line 2, but also frequency-converts the signal while the descrambler 32 either descrambles the TV signal selected by the converter 31 if the signal carries a chargeable program and has been scrambled by the control center apparatus 1, or passes the TV signal without descrambling if the signal has not been scrambled. The signal from the descrambler 32 is modulated to have a specific channel, e.g., channel 1 or channel 2, of a television receiver 4.

In addition to the above, the CATV terminal unit 3 comprises a branching device 33 for branching a part of the broadcasting signals in the upstream stage of the converter 31 to obtain the FSK signal transmitted as out-band data from the control center apparatus 1; an FSK data receiver 34 for demodulating the FSK signal from the broadcasting signals branched by the branching device 33; and a controller 35 comprising, for example, a CPU to which the FSK signal obtained by the FSK data receiver 34 is supplied.

Connected to the controller 35 are an input unit 36 consisting of a keyboard provided in the main body or a separately supplied remote control unit which is operated by the subscriber to input data related to the operation of the terminal unit 3; a display unit 37 for displaying various display data such as an input display when data is inputted from the input unit 36, and memory unit 38. The display unit 37 is for example an LED display. The memory unit 38 comprises a ROM for storing a control program for the controller 35 and a RAM for storing data such as the command data inputted from the input unit 36 and the data transmitted on the FSK signal from the control center apparatus 1.

The input unit 36 is provided with a confirming key 36a to be operated when confirming whether or not the program applied for by the subscriber over the telephone is registered at the control center.

In the above arrangement, the subscriber applies for a desired program by making a telephone call to the control center if the desired program found in a program list distributed to the subscriber in advance is a pay per event chargeable program.

Figure 2:
FIG. 2 is a diagram showing an example of the format of the authorizing command data which is transmitted by the center apparatus of FIG. 1.

The operator who has received the application operates the key(s) of the input unit 26 and inputs the subscriber's number, program number, or the like to register permission for watching the program. The data inputted by such a key operation into the input unit 26 is stored in a predetermined area in the RAM of the memory unit 27 with authorizing data as shown in FIG. 2 which can identify the program. Also included is a specific address for specifying the subscriber having made the application. The specific address is transmitted from the FSK data transmitter 25 as the out-band data when permission for watching the program has been registered.

When the FSK signal transmitted from the control center apparatus 1 is received by the FSK data receiver 34, the CATV terminal unit 3 determines whether or not the address in the signal is identical with its own address by demodulating the signal, and when it is found that the received FSK signal is addressed to itself, it takes the signal. If the FSK signal thus taken is the authorizing command data, the CATV terminal unit 3 stores the data related to the program number out of the received authorizing command data into the RAM of the memory unit 38. The program number data stored in the RAM of the memory unit 38 is read by operating the confirming key 36a of the input unit 36 and the program number is then displayed on the display unit 37 based on the read program number data. However, if the program number data is not stored, there is no display, and the fact that there is no display serves to notify the subscriber that his or her application was not accepted.

Thus, the subscriber is notified whether or not the control center has registered permission for watching the program he or she applied for by telephone by checking the program number displayed on the display unit 37 with the confirming key 36a.

If registration for the application has been made by the control center as described above, the fact that the application was made is stored in the RAM of the memory unit 27 at the control center apparatus 1. The contents stored in the memory unit 27 are then read before starting the broadcasting of the program and are transmitted in advance as the permission data from the FSK data transmitter 25 to the terminal unit of the subscriber who made the application. This permission data from the center apparatus 1 is received by the terminal unit 3 of the subscriber having made the application and stored in the RAM of the memory unit 38. Accordingly, if the terminal unit 3 has selected the channel of the applied for program when broadcasting of the program selected by telephone begins, the program applied for in advance by telephone can be received and watched.

Figure 4:
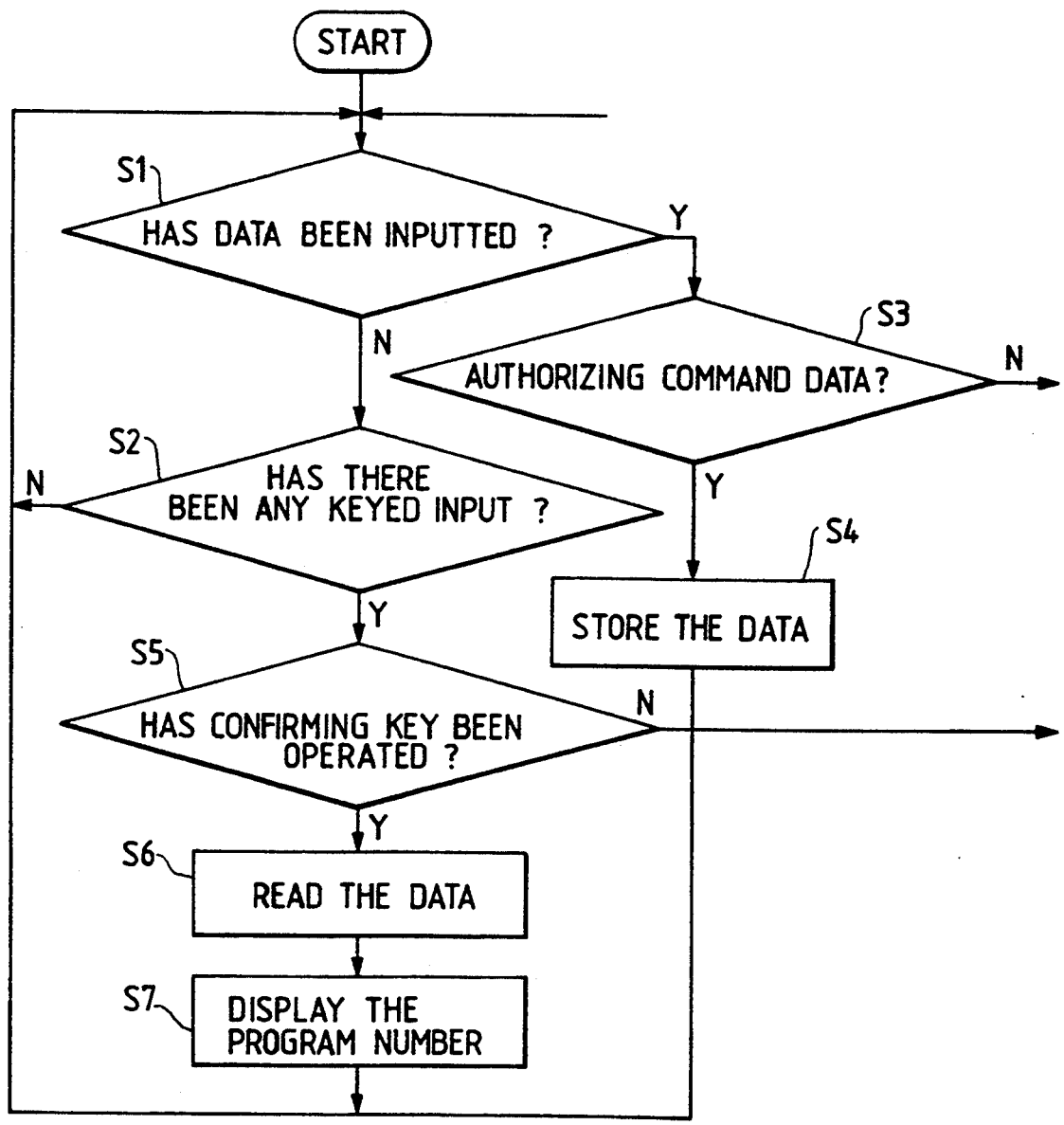
FIG. 4 is a flowchart showing a test performed by a controller in the CATV terminal unit of FIG. 1.

The operation of the CATV terminal unit 3 will now be described in detail with reference to the flowchart in FIG. 4 showing the task to be performed by the CPU of the controller 35 of the CATV terminal unit 3 according to a predetermined program.

The flowchart starts with turning on the power of the terminal unit 3 and judges whether or not there has been an input of any data received by the FSK data receiver 34 in the first step S1. If the judgment is NO, the CPU proceeds to step S2, where it is judged whether or not there has been any keyed input from the input unit 36. If there is not such an input and the judgment in S2 is NO, the CPU returns to step S1 to repeat the above steps.

On the other hand, if the judgment in S1 is YES, that is, there has been an input of the data received by the FSK data receiver 34, the CPU proceeds to step S3, where it is judged whether or not the data is an authorizing command. If the judgment is NO, i.e., the data is other than the authorizing command data, the CPU proceeds to another step (not shown). If the judgment is YES, i.e., the authorizing command data has been received from the control center apparatus 1, the CPU proceeds to step S4, where the data related to the program number in the authorizing command data is stored in a predetermined area in the RAM of the memory unit 38. Thereafter, the CPU returns to step S1.

Further, if the judgment in step S2 is YES, i.e., there has been a key operation of the input unit 36, the CPU proceeds to step S5, where it is judged whether or not the keyed input is based on the operation of the confirming key 36a. If the judgment in step S5 is NO, i.e., the input is based on the operation of the key(s) other than the confirming key 36a, the CPU proceeds to another step (not shown) and processes as instructed by the input based on the operation of the key(s) other than the confirming key 36a. If the judgment is YES, i.e., the input is based on the operation of the confirming key 36a, the CPU proceeds to step S6. In step S6, the CPU reads the data related to the program number stored in the predetermined area in the RAM of the memory unit 38, and then proceeds to step S7, where it causes the program number to be displayed on the display unit 37 based on the read data, and returns to step S1 to repeat the above-mentioned operation.

In the above-mentioned embodiment, the program number is read from the memory unit 38 and displayed on the display unit 37 by the operation of the confirming key 36a. However, if it is designed so that the program number of the applied program is also inputted together with the operation of the confirming key 36a, it is possible to display to the subscriber not the program number but an indication that the registration has already been made.

Further, in the above embodiment, the display based on the operation of the confirming key 36a is displayed on the display unit 37. However, it may also be displayed directed on the screen of the television receiver 4, whereby a reference to the program can easily be made at the start of broadcasting the program.

As described above, according to the present invention, the subscriber applies for a chargeable program, and the control center registers permission for watching the program at the terminal unit of the subscriber. At the same time, program number data of the applied for program is transmitted from the control center to the terminal unit of the subscriber having applied for the program, and is stored in the CATV terminal unit. A display of the applied for program is displayed by reading the stored data. In this way, the subscriber is easily notified whether or not the control center has approved the request for the program he or she applied for, and any anxiety associated with not knowing whether the application has been accepted is eliminated.

I claim:

1. A one-way addressable CATV system comprising a head end and at least one terminal unit comprising:
   means at said head end for transmitting program data to a subscriber prior to broadcasting a selected program that has been reserved by said subscriber and registered in said head end;
   memory means at said at least one terminal unit for storing said program data;
   input means at said at least one terminal unit for inputting an instruction for reading said program data stored in said memory means, wherein said input means comprises a confirming key for inputting said instruction for reading said program data stored in said memory means;
   reading means at said at least one terminal unit for reading said program data stored in said memory means according to said instruction; and
   display means responsive to said confirming key at said at least one terminal unit for displaying data by which said selected program is identified based on said program data read by said reading means, wherein said program data comprises a program number, identifying said selected program and said reading means comprises means for receiving said program number from said memory means.

2. A one-way addressable CATV system as claimed in claim 1, wherein said transmitted program data comprises program number data which identifies said program.

3. A one-way addressable CATV system as claimed in claim 1, wherein said head end comprises:
   UHF antenna means connected to a first signal processing means;
   VHF antenna means connected to a second signal processing means;
   BS antenna means connected to a third signal processing means through BS tuner means;
   mixer means connected to said first, second, and third signal processing means;
   video source means connected to said mixer means through switching means and TV modulator means;
   means for controlling said system connected to said switching means; and
   FSK data transmitting means connected between said mixer means and said controlling means.

4. A one-way addressable CATV system as claimed in claim 1, wherein said display means is a display unit.

5. A one-way addressable CATV system as claimed in claim 1, wherein said display means is a television receiver.

6. The system of claim 1 wherein said means for transmitting program data transmits an FSK signal in which a carrier is modulated by the program data by frequency-shift-keying.

7. A terminal unit for use in a one-way addressable CATV system, comprising:
   receiving means for receiving program data which are transmitted from a head end prior to broadcasting a selected program that has been reserved by a subscriber and registered in said head end;
   memory means for storing said program data received by said receiving means;
   input means for inputting an instruction for reading said program data stored in said memory means, wherein said input means comprises a confirming key for inputting said instruction for reading said program data stored in said memory means;
   reading means for reading said program data stored in said memory means according to said instruction; and
   display means for displaying data by which said selected program is identified based on said program data read by said reading means, said display means being responsive to said confirming key for displaying said data by which said selected program is identified, wherein said program data comprises a program number identifying said selected program and said reading means comprises means for receiving said program number from said memory means.

8. The system of claim 7, wherein said receiving means receives an FSK signal in which a carrier is modulated by the program data by frequency-shift-keying.

* * * * *